No. 717,301. Patented Dec. 30, 1902.
G. TELFORD.
SLUICE OR RUNWAY.
(Application filed Dec. 2, 1901.)
(No Model.)

Witnesses.
H. Monteverde
Walter F. Vane.

Inventor.
George Telford.
by N. A. Acker,
his atty.

UNITED STATES PATENT OFFICE.

GEORGE TELFORD, OF OROVILLE, CALIFORNIA, ASSIGNOR TO RISDON IRON AND LOCOMOTIVE WORKS, OF SAN FRANCISCO, CALIFORNIA, A CORPORATION OF CALIFORNIA.

SLUICE OR RUNWAY.

SPECIFICATION forming part of Letters Patent No. 717,301, dated December 30, 1902.

Application filed December 2, 1901. Serial No. 84,336. (No model.)

*To all whom it may concern:*

Be it known that I, GEORGE TELFORD, a citizen of England, residing at Oroville, county of Butte, State of California, have invented certain new and useful Improvements in Sluices or Runways; and I do hereby declare the following to be a full, clear, and exact description of the same.

The present invention relates to certain new and useful improvements in sluices or runways for the collecting of gold or precious metal carried by the water traveling therein. These sluices or runways are usually provided with bottom riffles or fibrous blankets secured to the bottom for the collecting of the precious metal. However, a certain per cent. of the float or light gold is carried off by the water, the force of which prevents the same from settling to the bottom of the sluice or runway and being caught. This is mainly due to the fact that the upper surface or strata of the water travels at a greater velocity than the bottom surface or strata, which is somewhat retarded by friction with the bottom of the sluice or runway. By practical operation I have discovered that by retarding and interrupting the flow of the water at its upper surface or strata, so as to cause the same to travel at approximately the same velocity as its lower strata, a quantity of the precious metal heretofore carried off by the flow of water is recovered.

Hence the object of the present invention is to interrupt or retard the flow of water at its upper surface as it passes through the sluice or runway, thereby "breaking up," so to speak, the body of water and causing the precious metal carried thereby to be deflected toward and onto the bottom collecting-surface of the runway or sluice.

To comprehend the invention, reference should be had to the accompanying sheet of drawings, wherein—

Figure 1:
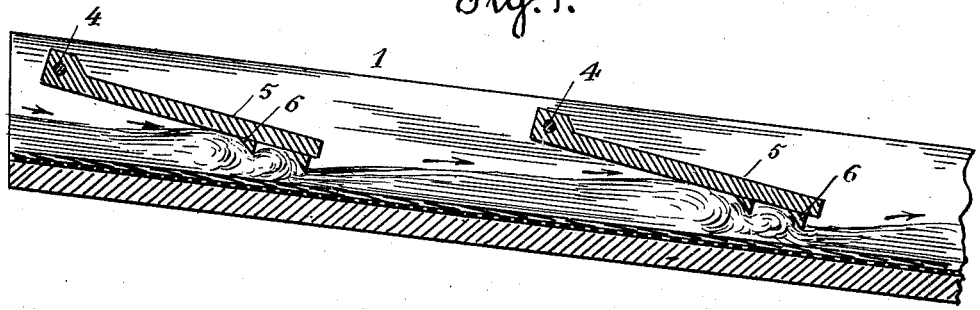
Figure 2:
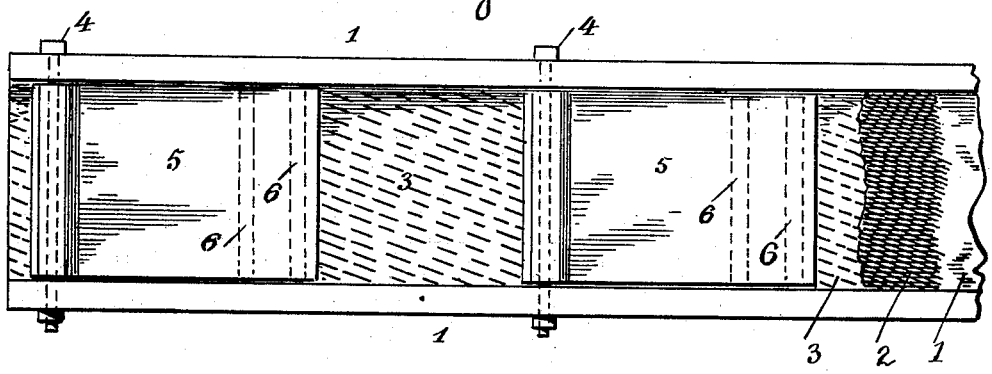
Figure 3:
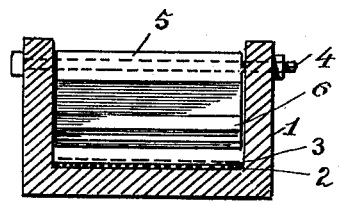

Figure 1 is a longitudinal sectional view of a sluice or runway. Fig. 2 is a top plan view of the sluice or runway, and Fig. 3 is a cross-sectional view of the sluice or runway.

In the drawings the numeral 1 is used to indicate any suitable form of sluice or runway for the water, to the bottom of which the usual fibrous collecting-matting 2 is attached. Above the collecting-matting is secured the riffle 3, usually composed of expanded metal.

To cross-rods 4, secured within the sides of the sluice or runway, are hinged the deflecting-plates 5. These plates fit within the runway or sluice and rest upon the surface of the water flowing therethrough. Said plates are free at their outer end, so as to permit of their swinging up and down. These plates serve to retard or check the flow of the water at its outer surface and to retard the same to such an extent as to cause the upper and lower surface or strata to travel at approximately the same velocity through the sluice or runway. This retardation of the flowing water at its upper surface gives an opportunity for the heavier particles carried thereby to settle upon the collecting-surface arranged at the bottom of the sluice or runway. However, I have ascertained that it is desirable to break up the upper surface of the stream, thereby creating a series of eddies and throwing the precious metal against the collecting-surface. For this purpose there is attached to each swinging deflecting-plate, near its outer end, one or more strips 6. These strips are preferably inclined or beveled outwardly, so as to give gradual check. These strips interrupt the flow of water and break up the same in the same manner as the under riffles, thereby creating a series of eddies and causing the water to turn over, thereby liberating the metal carried by the body of water. The body of water is thus broken and thrown downward, which, besides answering to direct the precious metal against the collecting-surface, serves to wash from the fibrous matting or the collecting-surface sand which may have settled thereon and give a clear surface for the mineral to adhere to.

By the described means there is provided for the runway or sluice what may be termed a "riffle" for the upper surface or strata of the stream, which acts to break the stream and retard its flow in substantially the same manner as the under riffle.

The deflecting or riffle plates are made of stiff material, by preference thin metal.

Having thus described the invention, what is claimed as new, and desired to be protected by Letters Patent, is—

A sluice or runway provided with deflecting-plates 5 pivotally secured at their upper ends to the sides of the sluice or runway and being suspended longitudinally thereof, the free end of each deflecting-plate being provided on its under surface with a series of transverse strips 6 rigidly secured thereto, said strips being inclined or beveled in the direction of flow through the sluice or runway, substantially as described.

In witness whereof I have hereunto set my hand.

GEORGE TELFORD.

Witnesses:
COLIN R. MCKENZIE,
N. L. MCKENZIE.